March 20, 1934.  E. W. PATTERSON  1,951,991

ASH RECEPTACLE AND EJECTOR

Filed June 19, 1931  2 Sheets-Sheet 1

Inventor

Edward W. Patterson,

By Milburn & Milburn

Attorneys

March 20, 1934. E. W. PATTERSON 1,951,991
ASH RECEPTACLE AND EJECTOR
Filed June 19, 1931 2 Sheets-Sheet 2
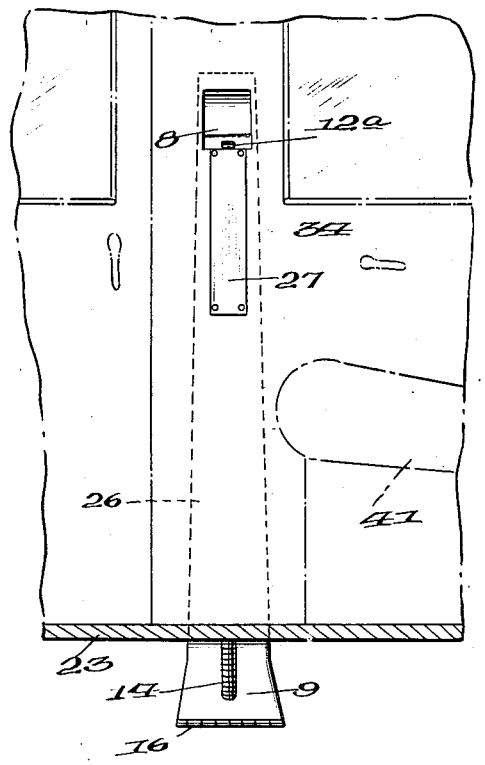
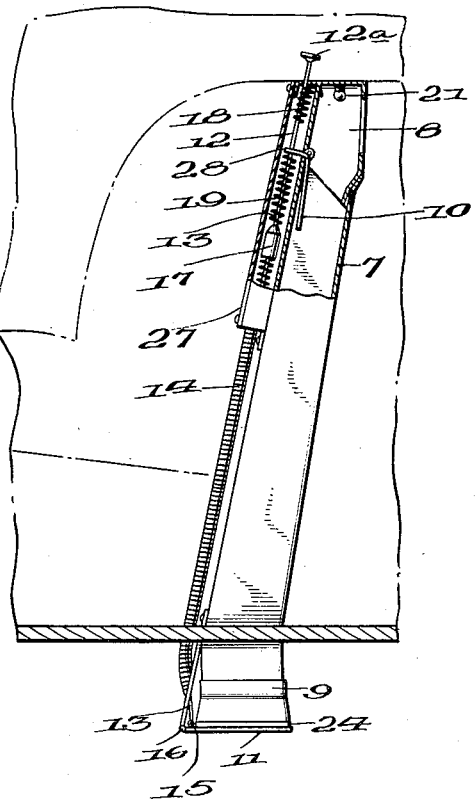
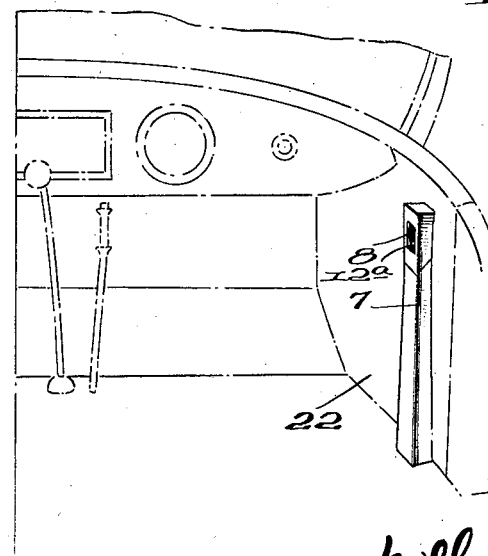
Inventor
Edward W. Patterson
By Milburn & Milburn
Attorneys Patented Mar. 20, 1934

1,951,991

UNITED STATES PATENT OFFICE 1,951,991

ASH RECEPTACLE AND EJECTOR

Edward W. Patterson, Pittsburg, Kans.

Application June 19, 1931, Serial No. 545,587

3 Claims. (Cl. 206—19.5)

The present invention relates to an ash receptacle and ejector, and more particularly to a device of this type designed for use on an automobile.

Ash receptacles, alone, are not entirely satisfactory for use on automobiles because the motion of the vehicle or air blowing into the vehicle soon scatters the ashes from the receptacles. A number of ash receptacles and ejectors, i. e., devices which permit the ashes to be dropped from the receptacle to the road, have been designed, but in many of these the ashes are blown back into the car by the current of air rushing through the ejector and into the car. Most of these devices also cause the automobile to be drafty.

The principal object of my invention is to provide an ash receptacle and ejector which will permit ashes placed in the ejector to be dropped upon the road while the car is running without any possibility of their being blown back into the car.

Another object of the invention is to provide a device of this type which cannot become clogged by any articles which can be placed in its upper aperture.

Still another object of the invention is to provide an ash receptacle and ejector which is air tight and will thus prevent drafts from blowing into the automobile through the ejector tube of the device.

Another object of the invention is to provide a device of the character described which can be readily applied to any automobile and which may be readily and economically constructed.

Figure 1:
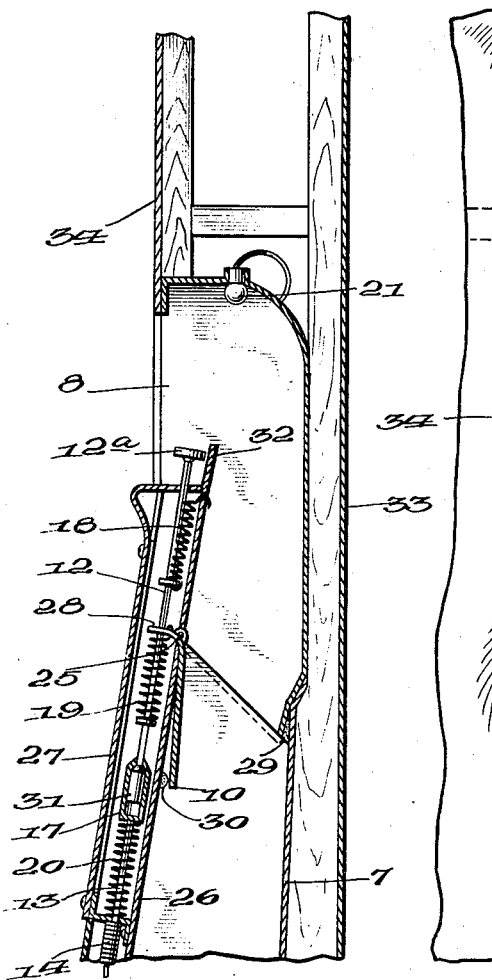
Figure 2:
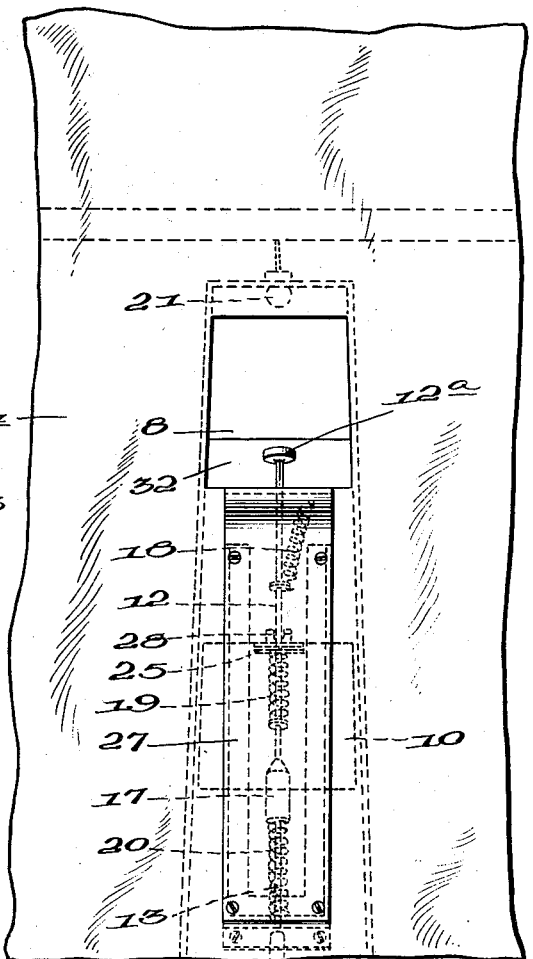
Figure 2:
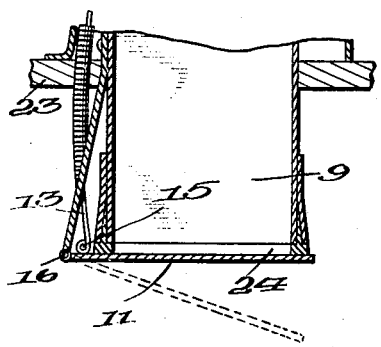
Figure 2:
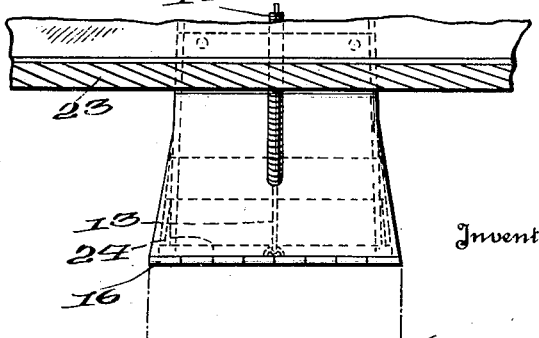

Other objects of the invention will be apparent from the following specification and drawings in which Figure 1 is a vertical sectional view through one side wall of an automobile, showing my invention applied therein, Figure 2 is a front elevation, taken at right angles to Fig. 1, Figure 3 is a view similar to Fig. 2, but on a smaller scale, Figure 4 is a vertical cross-sectional view showing my device mounted on the rear of the front seat of an automobile, and Figure 5 is a diagrammatic elevation showing my invention mounted in the front of an automobile.

Referring to Figs. 1, 2, and 3 of the drawings, the numeral 33 indicates the side wall of an automobile having the ash receptacle and ejector, generally indicated by the numeral 7, secured therein. The device 7 is in the form of an elongated tube tapering outwardly or enlarging toward its lower end 9. The device may be of any cross-section, but the embodiment illustrated in the drawings is generally rectangular in cross-section. A receiving aperture 8 is provided at the upper end of the device in the inner or front wall flush with the upholstery thereof, and ashes, matches, and the like may be dropped through this opening for disposal by the ejector. If desired, an electric bulb 21 may be provided in the casing 7 above the aperture 8 to illuminate the aperture.

An air or upper shutter 10 is provided in the upper end of the casing just below the receiving aperture 8, the inner edge of the shutter being pivoted to the inner wall 26 of the casing at 25. A dump shutter is provided at the lower end of the device, this shutter being pivoted at 16 at a point spaced beyond the inner wall 26 of the casing. The air shutter 10 is normally open and the dump shutter 11 is normally closed against rubber inserts 24 about the lower edge of the casing, the rubber inserts preventing air from entering the tube and blowing up into the car.

The mechanism to operate the shutters 10 and 11 is arranged within an operating compartment covered by a removable plate 27 which is also flush with the upholstery 34, and comprises two rod sections, an upper section 12 and a lower section 13. The upper end of the rod section 12 projects from the upper end of the operating compartment and is provided with an operating head or button 12a positioned immediately in front of the front shoulder 32 of the receiving aperture 8. The rod 12 is normally held in upward position by the pull of a coil spring 18 having one end fixed to the underside of the top of the compartment and its other end secured to the rod 12. The rod 12 extends through an aperture in a shoulder 28 on the shutter 10 and is operatively connected to the shoulder and shutter, preferably by a coil spring 19 having one end fixed to the shoulder 28 and its other end fixed to the rod 12. Downward pressure of the rod 12, against the action of spring 18, will be transmitted to the shoulder 28 through the spring 19 and the shutter 10 will be swung upwardly against rubber inserts 29 on the inner wall of the casing 7. When the pressure is released the shutter 10 will snap back to open position against a rubber stop 30. The spring 19, the rubber insert 29, and the rubber stop 30 will all obviate any rattling of the shutter 10 and rod 12.

The lower end of the rod 12 has a head 31 thereon which is seated in and guided by a socket 17 secured to the upper end of the lower rod section 13. Rod section 13 is held in upward position by a coil spring 20 between the lower end of socket 17 and the lower wall of the operating compartment 27. The rod section 13 is preferably somewhat flexible and is shown mounted within a wrapped or coiled spring casing 14. The lower end of this rod is attached to the shutter 11 in front of the pivot 16 with the result that downward pressure on the rod 13 will open shutter 11. Shutter 11 is normally held closed by the action of spring 20 on rod 13. The head 31 on the lower end of the upper rod 12 does not extend entirely to the bottom of the socket 17 on rod 13 and this permits the rod 12 to be moved down and upper shutter 10 closed before rod 12 acts on socket 17 to force lower rod 13 downwardly to open dump shutter 11. It will also be noted that dump shutter 11 will close again before upper shutter 10 can open.

Because of the above-described operation of the shutters 10 and 11, ashes or like débris dropped on the dump shutter 11 will remain there until the rod 12 is pressed down by the user. By such action, shutter 10 is first closed, and shutter 11 is then opened and the refuse dropped from the device. One of the shutters is always closed, and it follows that no draft can enter the tube 7 nor can refuse be blown back and out of receiving aperture 8 into the car.

It will be noted that spring 18 on the upper rod section 12 holds the head 31 on the lower end of this rod up and in close contact with the upper closed end of socket 17, thereby preventing any rattling between these parts.

In Fig. 4, the construction of the device is substantially the same as that described above except that the casing is modified so that it may be positioned in the rear side of the front seat of an automobile, the operating button 12a extending above the top of the seat and the operating compartment being in the rear of the casing 7.

In Fig. 5, the casing is modified to be attached to the inner wall of an automobile, the operating button 12a being just within the receiving aperture 8.

I claim:

1. An ash receiver and ejector for vehicles comprising a substantially vertically disposed conduit having its discharge end projecting outside of the vehicle, said conduit having a receiving aperture in its upper end and a discharge aperture in its lower end, a normally open closure in the receiving aperture, a normally closed closure in the discharge aperture, and a closure operating rod connected by a direct connection to said receiving aperture closure and connected to said discharge aperture closure by a connection providing sufficient lost motion to effect the closing of said receiving aperture closure by said operating rod before said discharge aperture closure is opened.

2. An ash receiver and ejector for vehicles comprising a substantially vertically disposed conduit having its lower end projecting outside of the vehicle, said conduit having a receiving aperture in its upper end and a discharge aperture in its lower end, a substantially vertical reciprocable closure operating rod formed of upper and lower sections, a lost motion joint connecting said rod sections, a normally open closure hingedly positioned in said receiving aperture, means connecting said receiving aperture closure to said upper rod section, a normally closed closure hingedly positioned in said discharge aperture, and means connecting said lower rod section to said discharge aperture closure, said joint having sufficient lost motion to permit the closing of said receiving aperture closure by said operating rod before said discharge aperture closure is opened.

3. An ash receiver and ejector for vehicles comprising a substantially vertically disposed conduit having a receiving aperture in its upper end and a discharge aperture in its lower end, a substantially vertical reciprocable closure-operating rod outside of said conduit and adjacent a wall thereof, said rod being formed of aligned upper and lower sections, a lost-motion joint connecting said rod sections, means slidably supporting said sections, a normally open closure in said receiving aperture pivotally secured to the conduit wall adjacent said upper rod section, said closure having a portion projecting through an opening in said wall and having an aperture in said projecting portion through which said upper rod section passes, a spring connected at its respective ends to said upper rod section and said projecting portion, a normally closed closure hingedly positioned in said discharge aperture, means operatively connecting said lower rod section to said discharge aperture closure, and spring means normally holding said upper and lower rod sections in elevated position, said joint having sufficient lost-motion to permit the closing of said receiving aperture closure by said operating rod before said discharge aperture closure is opened.

EDWARD W. PATTERSON.